March 16, 1926.
F. L. MAIN
1,576,921
REENFORCED DISK WHEEL
Filed July 9, 1923
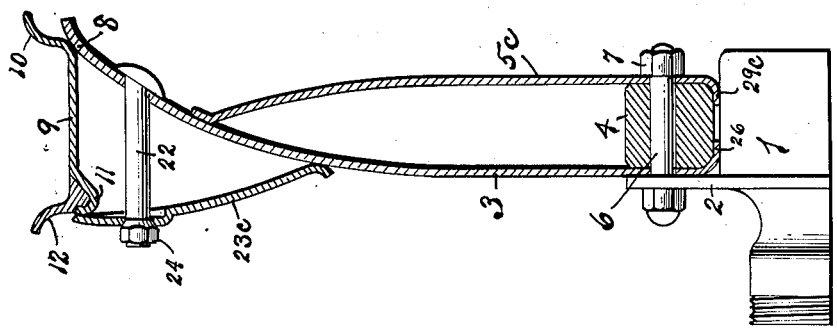
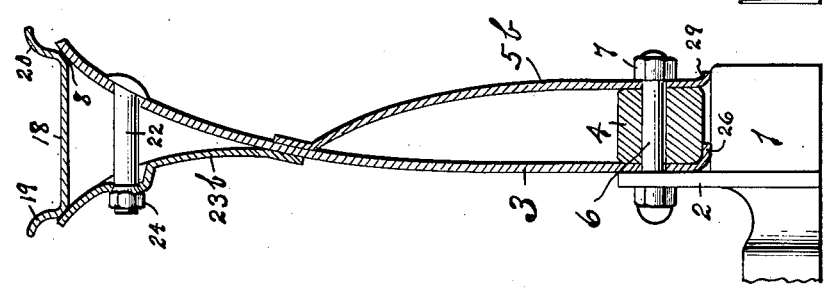
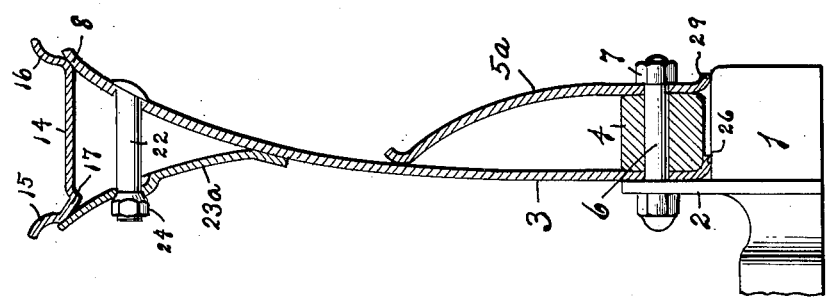
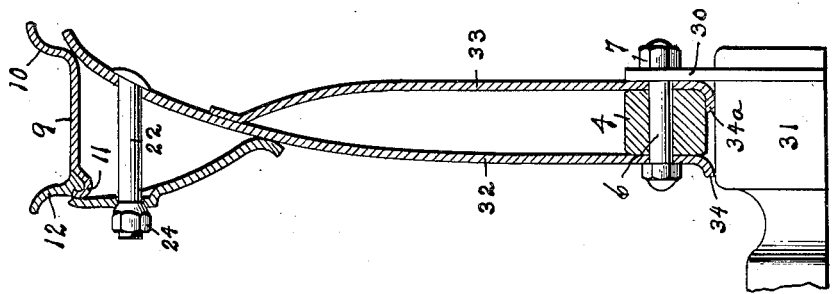
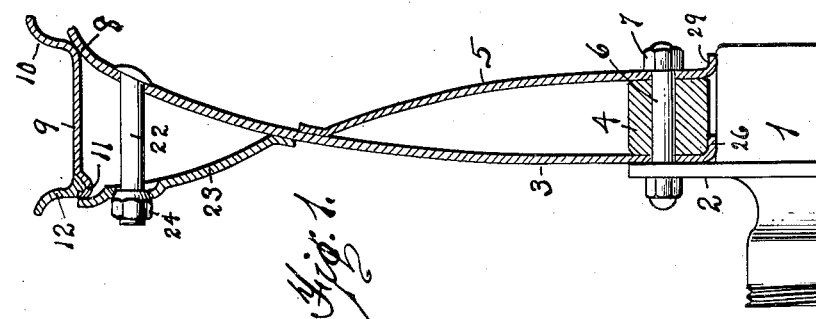
INVENTOR.
F. L. Main.
By
Edward N. Pagelsen
ATTORNEY.

Patented Mar. 16, 1926.

1,576,921

UNITED STATES PATENT OFFICE.

FRANK L. MAIN, OF BIRMINGHAM, MICHIGAN, ASSIGNOR TO HAYES WHEEL COMPANY, OF JACKSON, MICHIGAN, A CORPORATION OF MICHIGAN.

REENFORCED DISK WHEEL.

Application filed July 9, 1923. Serial No. 650,280.

*To all whom it may concern:*

Be it known that I, FRANK L. MAIN, a citizen of the United States, and residing at Birmingham, in the county of Oakland and State of Michigan, have invented a new and Improved-Reenforced Disk Wheel, of which the following is a specification.

This invention relates to the construction of vehicle wheels in which the connection between the rim and hub consists of a disk of sheet metal, and the object of this invention is to produce a wheel of this character adapted to receive a demountable rim and in which the disk is reenforced to withstand axial stresses by means of a second disk.

This invention consists of a pair of oppositely dished disks and a hub whereon the disks are rigidly mounted, means to space apart the disks at the hub, one of said disks being larger in diameter than the other and having its outer edge adapted to receive the edge of a demountable rim, a clamping ring to secure the demountable rim on the disk and bolts carried by the disk to secure the clamping ring in position.

It also consists in the details of construction illustrated in the accompanying drawing and particularly pointed out in the claims.

In the drawing, Figs. 1 to 5 inclusive are sections along axial planes of five different wheels embodying the present invention.

Similar reference characters refer to like parts throughout the several views.

The disks of vehicle wheels must be sufficient to withstand the axial stresses and when of sufficient strength for this purpose have usually more than sufficient strength to withstand all the stresses due to loading.

Vehicle wheels are usually dished to withstand axial stresses but each of the two wheels on an axle is usually relied upon to withstand such stresses principally in one direction only. In the present case, a main dished disk is provided to resist the stresses resulting from an inward pull of the axle on the hub while a reenforcing disk is provided to transmit the outward pressure received by the hub from the axle to the outer portion of the main disk, the diameter of this reenforcing disk and therefore the distance from the tire at which such stresses are transmitted to the auxiliary disk depending upon the loads to be carried and the conditions of traffic. These same conditions will also determine the distance between the disks at the hub on which they are mounted. In each of the embodiments shown, means are provided for rigidly uniting the hub and the two disks so that the disks will be in parallel planes for a short distance from the hub. But these disks are oppositely dished to resist axial stresses as above stated. By this present construction all unnecessary metal is omitted.

The hub 1 shown in Figs. 1 to 4 inclusive is formed with a flange 2 to which is rigidly secured the main disk 3, the spacing ring 4, and the auxiliary disk 5, $5^a$, $5^b$ or $5^c$, by means of bolts 6 and nuts 7. The disk 3 is dished so as to present a convex surface toward the outer end of the hub and its periphery presents a rounded surface 8 with which the demountable rim may have line contact. In Figs. 1 and 4 a Q. D. type of rim is shown having a cylindrical central portion 9, a rear flange 10 and an interior rib 11 which is formed in providing a channel to receive the spring ring 12.

Fig. 2 shows a demountable rim 14 having a front flange 15, a rear flange 16, and a conical surface 17. In Fig. 3 the demountable rim 18 has two similar flanges 19 and 20.

Bolts 22 are mounted in the disk 3 near its periphery and extend through holes in the clamping ring 23, $23^a$, $23^b$ or $23^c$, the nuts 24 having conical inner ends and the clamping rings having conical holes to receive these nuts.

The inner edge of the clamping ring is preferably flattened to fit against the disk and its outer edge fits the rib 11 shown in Figs. 1 and 4, the conical surface 17 in Fig. 2, and the outer corner of the demountable rim in Fig. 3. In each embodiment the disk has a line contact with the demountable rim on the inner side of the central plane or load plane of the wheel, then crosses the plane of the wheel to a circumferential bearing surface of the hub outside of said load plane, where a cylindrical bearing flange 26 is preferably formed on this disk. The amount this disk is dished is determined by the width of the demountable rim and of the spacing ring 4.

The reenforcing disk 5, $5^a$, $5^b$ or $5^c$ is dished in the opposite direction from the main disk 3 and it is so formed that when the nuts 7 are screwed down, a considerable pressure is exerted by its outer edge on this main disk. In order, however, to obtain all possible advantage of the resilience of the main disk and the auxiliary disk, there is no rigid connection between them but they are permitted to slide upon each other. The inner edge 29 or 29ᶜ of the reenforcing disk is also in the form of a bearing flange.

The diameter of the reenforcing disk and the width of the clamping ring will vary with the load to be carried and under exceptional conditions, these two parts of the wheel may overlap as shown in Fig. 4. In that figure, the flange 29ᶜ on the reenforcing disk is shown turned inwardly toward the flange 26.

The circular triangle formed by the rim, the clamping ring and the outer portion of the disk 3 constitutes a powerful structure which can be distorted only under exceptional stresses and the opposite dishing of the main and reenforcing disks produces a wheel web which is especially adapted to resist axial stresses in either direction.

In Fig. 5, the flange 30 on the hub 31 is at the inner end of the hub and the main disk 32 and reenforcing disk 33 have their inner flanges 34 and 34ᵃ turned toward the front end of the hub. The functions of the several parts of this wheel structure are the same as in the embodiments before described. In this embodiment, as in those of Figs. 2 and 4, the clamping ring and the reenforcing disk overlap and greatly strengthen the wheel.

The details of construction and the proportions of the parts may all be changed by those skilled in the art without departing from the spirit of my invention as set forth in the following claims.

I claim:—

1. In a vehicle wheel, the combination of hub and a rim, a main disk rigidly attached to the hub and bearing against but unattached to the rim, a reenforcing disk attached to the hub, means to space the disks at the hub, the outer edge of the reenforcing disk engaging the main disk between the hub and rim but unattached thereto, and a clamping ring to secure the rim to the main disk.

2. In a vehicle wheel, the combination of a hub and a demountable rim, a dished disk mounted on the hub outside of the medial plane of the wheel and curving back to cross said plane and press against the rear edge of said rim, bolts mounted in the outer portion of the disk, a clamping ring mounted on the bolts and having its inner edge pressing against the disk and its outer edge pressing against the front edge of said rim, and a reenforcing disk mounted on the hub and having its outer edge slidably pressing against the main disk, means to space said disks at the hub, and means to rigidly secure the disks to the hub.

3. In a vehicle wheel, the combination of a hub and a demountable rim, a pair of disks of different diameters rigidly attached to the hub, means mounted on the hub to space the disks, the said disks being oppositely dished to cause them to slidably engage, the outer edge of the larger disk engaging the rear edge of the demountable rim, bolts mounted in the larger disk adjacent the rim, and a clamping ring mounted on the bolts in engagement with the rim and main disk, said rim, disk and clamping ring constituting a ring of substantially triangular cross section.

4. In a vehicle wheel, the combination of a hub and a demountable rim, a pair of disks of different diameters rigidly attached to the hub, means mounted on the hub to space the disks, the said disks being oppositely dished to cause them to engage, the outer edge of the larger disk engaging the rear edge of the demountable rim, bolts mounted in the larger disk adjacent the rim, and a clamping ring mounted on the bolts in engagement with the rim and main disk, said rim, disk and clamping ring constituting a ring of substantially triangular cross section the width of the clamping ring and diameter of the disk of smaller diameter being sufficient to cause them to overlap.

5. In a vehicle wheel, the combination of a hub and a demountable rim, a pair of disks of different diameters rigidly attached to the hub, means mounted on the hub to space the disks, the said disks being oppositely dished to cause them to engage, the outer edge of the larger disk engaging the rear edge of the demountable rim, bolts mounted in the larger disk adjacent the rim, and a clamping ring mounted on the bolts in engagement with the rim and main disk, said rim, disk and clamping ring constituting a ring of substantially triangular cross section, the contacts between the main disk and the disk of smaller diameter on one side and the clamping ring on the other permitting movement under axial stresses on the wheel.

6. In a vehicle wheel, the combination of a hub and a rim, a main disk and a reenforcing disk of less diameter on the hub, means on the hub to space the disks, means to rigidly secure the disks to the hub and to press their outer edges toward each other, said disks being oppositely dished, bolts mounted in the main disk near its outer edge, a clamping ring removably mounted on the bolts on the opposite side of the main disk from the reenforcing disk, and a demountable rim frictionally held between the main disk and clamping ring.

FRANK L. MAIN.